July 25, 1950

A. MENZER ET AL 2,516,639

ALTIMETER

Filed April 27, 1945

Inventors
William E. Naylor
Anton Menzer

By C. J. Kalman
Attorney

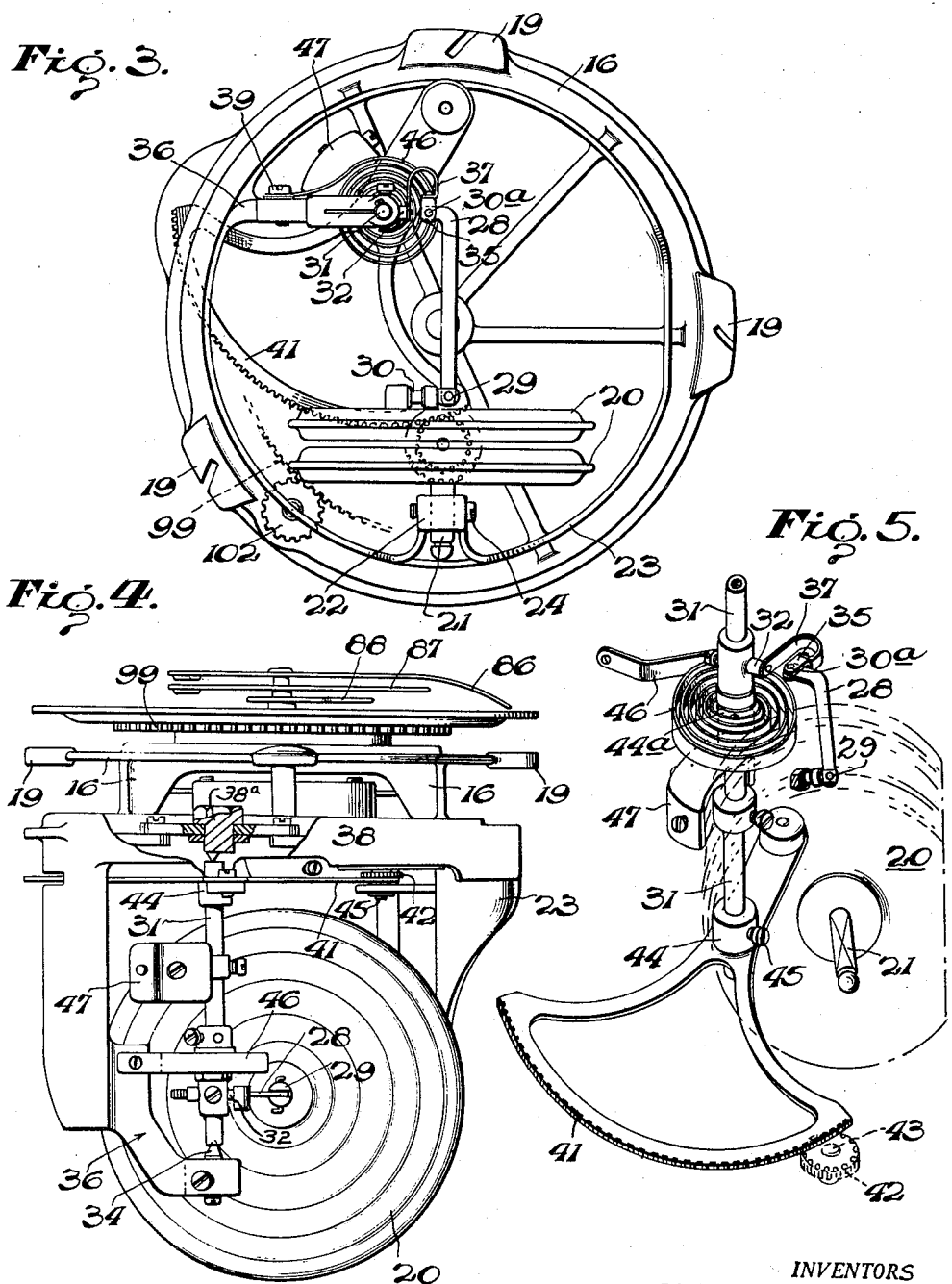

July 25, 1950

A. MENZER ET AL 2,516,639

ALTIMETER

Filed April 27, 1945

INVENTORS
William E. Naylor
BY Anton Menzer.
C. J. Kalman.
ATTORNEY

July 25, 1950     A. MENZER ET AL     2,516,639
ALTIMETER
Filed April 27, 1945     5 Sheets-Sheet 4
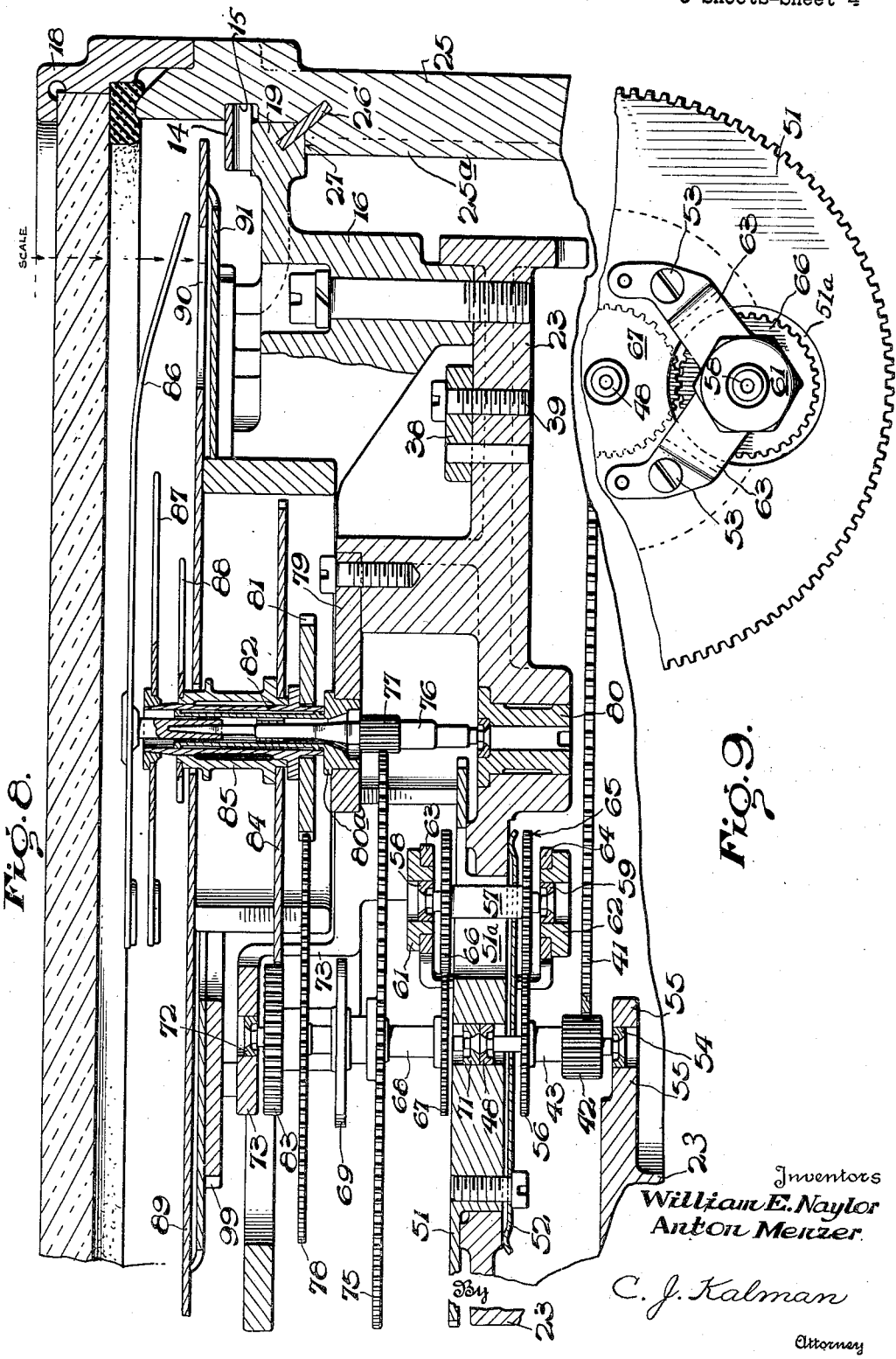
Inventors
*William E. Naylor*
*Anton Menzer*
Attorney July 25, 1950
A. MENZER ET AL
2,516,639
ALTIMETER
Filed April 27, 1945
5 Sheets-Sheet 5
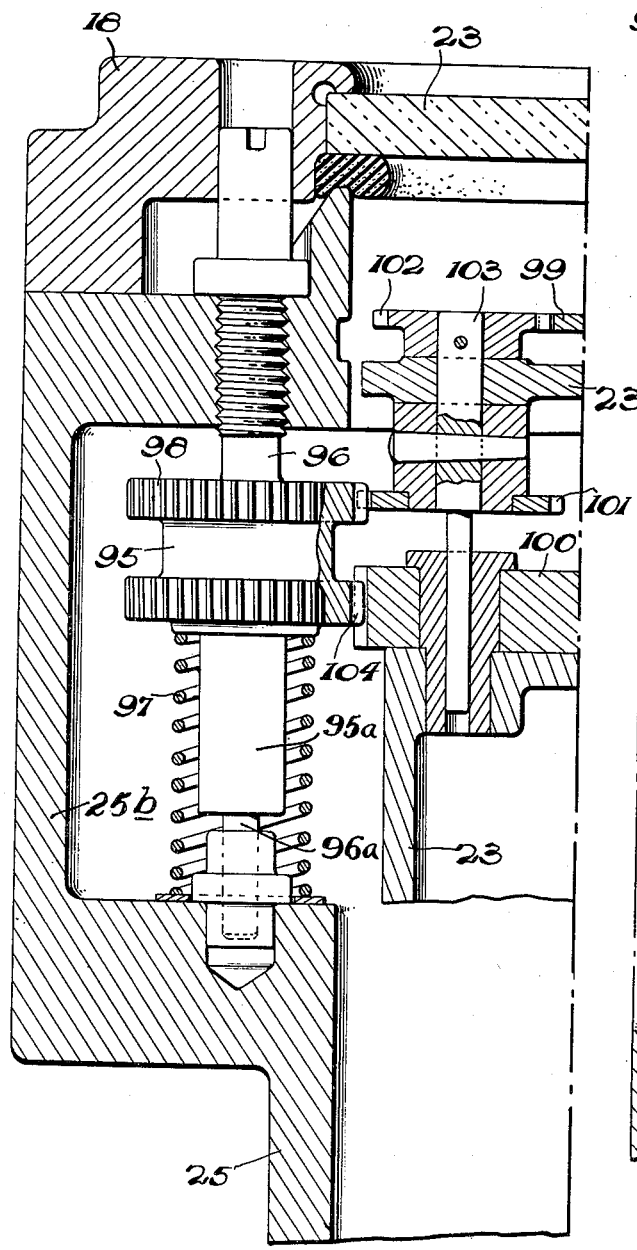
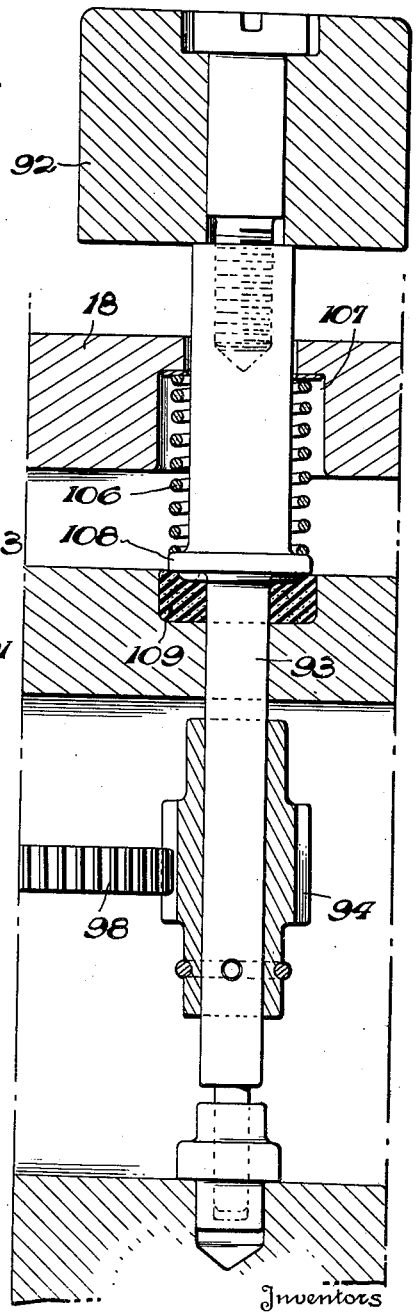
Inventors
William E. Naylor
Anton Menzer.
By C. J. Kalman
Attorney Patented July 25, 1950

2,516,639

UNITED STATES PATENT OFFICE 2,516,639

ALTIMETER

Anton Menzer, Teaneck, and William E. Naylor, Ridgefield Park, N. J., assignors to Bendix Aviation Corporation, Teterboro, N. J., a corporation of Delaware Application April 27, 1945, Serial No. 590,664

4 Claims. (Cl. 73—387)

The present invention relates generally to barometric pressure instruments and particularly to sensitive altimeters for aircraft.

An object of the present invention is to provide novel improvements in sensitive altimeters for aircraft.

Another object is to provide a novel gear train arrangement for driving a plurality of pointers for use with altimeters and the like.

Another object is to provide improvements in instruments embodying a plurality of scales and pointers for indicating various altitude ranges, whereby to increase the altitude range of measurement of such instruments.

Another object of the invention is to provide novel improvements in sensitive altimeters to thereby amplify the response of a pressure sensitive means, so as to increase the range of the instrument up to 75,000 feet.

Another object is to provide a novel pointer gear train adapted to increase the range of altitude indications and arranged to be convertible to thereby provide means for setting the pointers independently of the pointer actuator.

Another object is to provide novel setting means for barometric pressure indicators.

Another object is to provide in a sensitive altimeter a novel planetary gear train adapted to have an increased arc of rotation for barometric setting.

Still another object of the invention is to provide novel means in a sensitive altimeter for setting the indicator so as to read zero at a predetermined point of different elevation with respect to the sea level of a first point without changing the datum of the barometric pressure means in the instrument.

Another object of the present invention is to provide separate direct drives for each pointer shaft of the instrument to thereby eliminate drag on the fast pointer shaft.

Another object is to provide in an indicating instrument of the class described, improved novel means for setting the instrument for a known altitude indication at or from a point of destination, so that at such point, the altimeter will show zero when the wheels of the aircraft touch the ground irrespective of any known variation in barometric pressure at the ground point of destination.

The above and other objects will appear more fully hereinafter from the following detailed description when taken in connection with the accompanying drawings. It is to be expressly understood, however, that the drawings are for the purposes of illustration only and are not designed as a definition of the limits of the invention, reference being had for this purpose to the appended claims.

In the drawings, wherein similar reference characters denote similar parts throughout the several views:

Figure 3 is a bottom plan view of the instrument removed from the casing so as to show the relative positions of the barometric pressure element and its connections.

Figure 4 is a side elevational view of the barometric pressure element and its supporting frame and rock shaft connections to the several indicator hands.

Figure 5 is a reversed perspective view of the rock shaft and interconnected elements which are driven from the barometric pressure aneroid.

Figure 8 is an enlarged cross sectional view taken along line 8—8 of Fig. 1 of the indicator hands and the novel setting means therefor.

Figure 9 is a top plan longitudinal view partly broken away of the novel planetary arrangement which makes up the setting mechanism.

Figure 10 is a longitudinal cross sectional view taken along line 10—10 of Figure 1 showing part of the manually controlled setting mechanism, and Figure 11 is an enlarged cross sectional view taken along line 11—11 of Figure 1 showing the connections from the setting knob.

Figure 1:
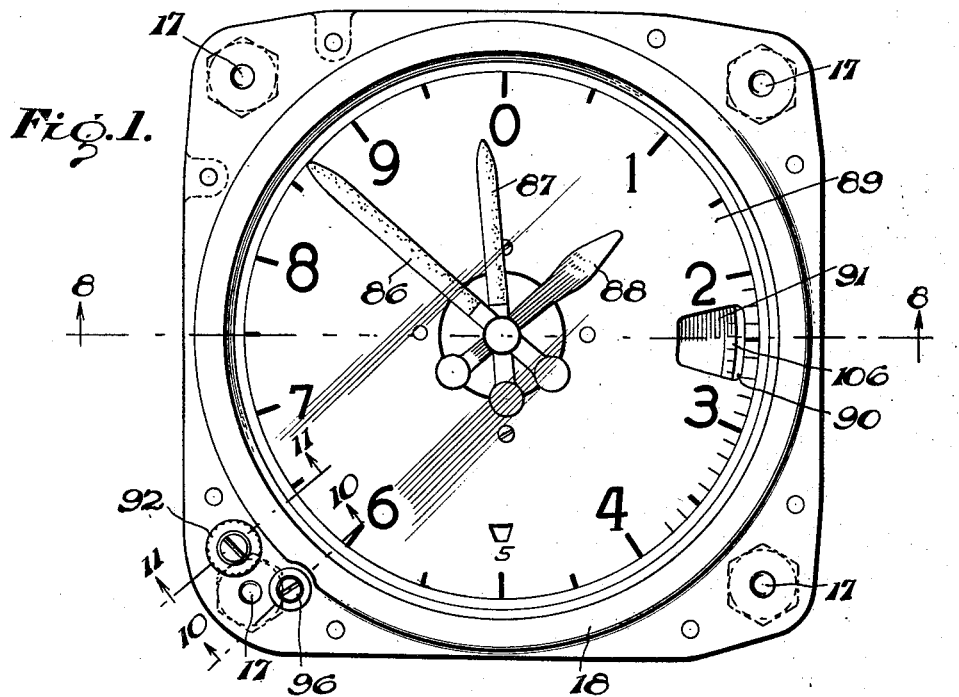
Figure 1 is a top plan or front elevation view of the indicator dial showing three hands adapted to rotate relative thereto.
Figure 2:
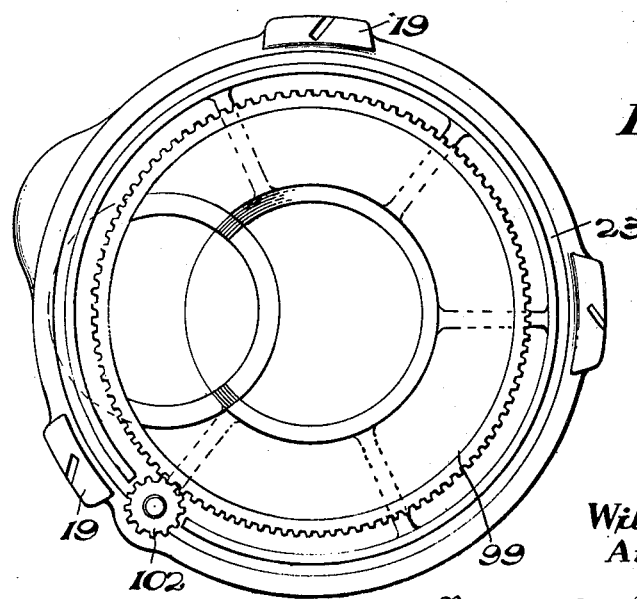
Figure 2 is a top plan view of the instrument with the dial removed showing the ring gear mechanism adapted for driving the under-dial.
Figure 6:
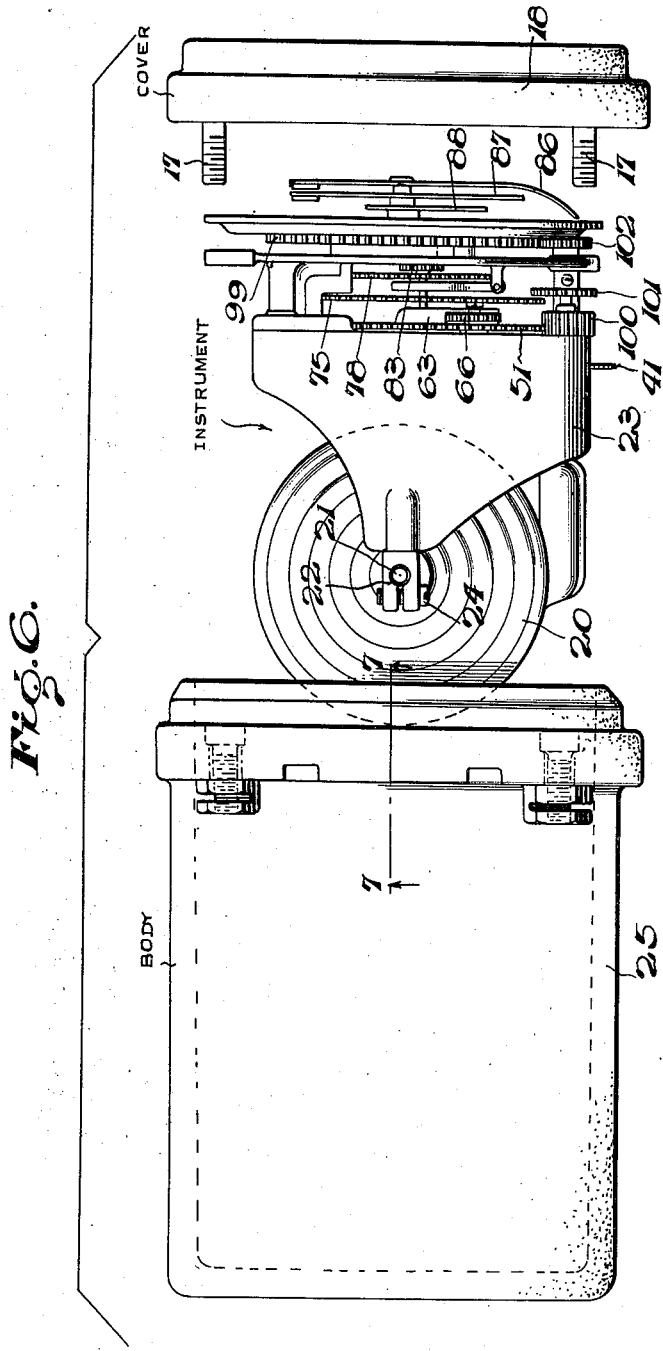
Figure 6 is a side elevational view of the entire instrument showing it exploded or pulled apart with respect to the casing which houses the operating parts.
Figure 7:
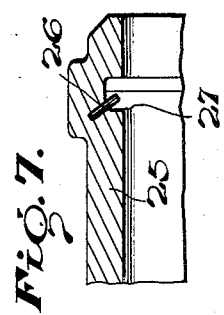
Figure 7 is a fragmentary cross section view of a part of the instrument casing adapted to show the positioning means mounted in the rim thereof for the frame of the instrument mechanism.

Referring to the drawings and first with reference to Figures 1 and 6, there is illustrated a bezel cover 18 adapted to be secured to a casing 25 by suitable fastening means such as bolts or screws 17 in correspondingly located threaded bores or openings in the open end of casing 25. Ready for insertion and mounting in the casing 25 is shown the mechanism assembly including an aneroid 20 mounted in a compound frame structure including a frame 23 and an upper frame 16 having slotted mounting lugs 19, see Figure 8. This compound frame structure mounts the pointer operating gear trains, the instrument pointer dial, and the barometric pressure indicating under-dial and operating mechanism therefor, all to be described hereinafter in detail.

The casing 25 is provided with a plurality of elongated ribs 25a shown extending longitudinally of the casing terminating in seats 27, in which as well as frame 16, may be embedded inwardly extending members, such as pins 26 to hold frame 16 in position. When the entire mechanism carried by the upper frame 16 and the lower frame 23 is inserted within the casing 25, pins 26 extend through the slots of lugs 19 and center the mechanism in the casing on seats 27 after which a corrugated retaining ring 14 is inserted in groove 15 above seats 27 as shown in Figure 8.

Referring next to Figures 3, 4 and 5 for further details, the altimeter may comprise the aneroid 20 carried by a support or stud 21 which at one end is secured by a split bearing or stud 22 and lock screw 24 carried by the frame 23. Means are provided for transmitting and amplifying the movement of the aneroid 20 upon expansion or contraction thereof in response to changes in atmospheric pressure, in order to produce suitable indications of such changes, which indications may be in terms of barometric pressure or altitude in feet or meters. As shown, such means includes a link 28 pivoted on a bimetal arm 30 in split stud 29, which is secured to the aneroid 20 at one end. Link 28 may be made angular or L-shaped, so as to pivot at the other end on pin 30a in split stud 35 secured to a spring 37, which may be U-shaped as shown, so as to be secured to the head of a bolt 32 extending from rock shaft 31 at substantially right angles to the axis thereof.

The rock shaft 31 is journaled between means, such as pivot pin 34 in the end of the integrally formed bracket 36 of frame 23, and in an eccentrically mounted adjustable hub 38a in plate 38 secured to the lower frame 23 by bolt 39, see Figure 4. Turning of the eccentrically mounted hub 38a, in plate 38 will provide adjustment between sector gear 41 and pinion 42 on pinion shaft 43, which is part of a novel pointer driving gear train hereinafter described. The sector gear 41 is mounted on rock shaft 31 by bushing 44 and screw 45, see Figure 5.

When the aneroid 20 is actuated, the rock shaft 31 will angularly vary the position of the pinion shaft 43 through its connection with pinion gear 42 by aid of a coil spring 46 anchored to a collar or bushing 44a at its inner coil end and to the bracket 36 at its outer coil end. Also, on rock shaft 31 may be mounted the usual counterweight 47.

*Pointer drive gear train*

Figure 8 of the drawings shows the detailed arrangement of the novel pointer driving gear train, which is designed to function as a direct drive to the pointers independently of any planetary action, as long as the pointers are set at a specific barometric scale reading. However, as is hereinafter explained, a part of the gear train pointer drive is convertible into a planetary gear train for the purpose of simultaneously setting the pointers and the under-dial to give true altitude readings, although means are also provided to adjust the under-dial with respect to the pointer movement.

The pointer driving gear train comprises a pinion shaft 43 journaled in a jewel or other suitable bearing 48 housed within the lower part of the thickness of a large planetary gear 51, which is the carrier gear of a planetary gear train hereinafter described, and in a smaller jewel or other suitable bearing 54 in lug 55 of the frame 23, so that it is free to rotate when sector gear 41 is turned by deflection of aneroid 20 connected thereto. The large gear 51 is clutched to the frame 23 by a friction spring clutch plate 52, so as to normally remain fixed against rotation in the frame 23.

Mounted on shaft 43 of pinion gear 42 is gear 56, having teeth meshing with a gear 65 having a relatively greater number of teeth than gear 56. The gear 65 is mounted on a shaft 57 journaled in jewel bearings or other suitable mountings 58 and 59 in eccentric bushings 61 and 62 carried in the apertured bearing arms of parallel upper and lower bearing bracket arms 63 and 64 fixed to gear 51 and extending in spaced relation above and below the same providing adjustment for setting proper meshing of the gear teeth of the various gears, thus being adjustably mounted in brackets 63 and 64, respectively, secured to the flat upper and lower sides of large planetary gear 51 at an aperture 51a therein by suitable means, such as bolts 53, see Figure 9, so that these parts and gears 65 and 66 turn with the planetary gear 51.

Thus it is apparent that shaft 57 is operatively connected or geared to pinion shaft 43 by gear 65 in mesh with gear 56, said gear 65 having a relatively greater number of teeth than gear 56, such for example as sixty-five teeth for the gear 65 and sixty-three teeth of gear 56. Gear 65 is free to rotate between bracket 64 and the underside of the normally set large gear 51. Similarly mounted on the upper end of shaft 57 to also turn with gear 51, is a gear 66, which in this embodiment to cooperate with the gears 56 and 65 may be provided with sixty-three teeth, and is adapted to rotate with shaft 57 and gear 65. Gear 66 in turn meshes with a gear 67 which may have sixty-five teeth, and is mounted on shaft 68 disposed end to end and above shaft 43, thus providing a differential planetary arrangement for actuating the pointers when large carrier gear 51 is rotated, as to be hereinafter described. The smaller the difference between the relative numbers of the intermeshing teeth of gear sets 56—65 and 66—67, the greater is the arc of planetary movement, and consequently the finer are the possible pointer settings to accord with barometric presure settings up to an altitude of 50,000 feet, or even up to 75,000 feet depending upon the ratio of the number of teeth of the sector gear 41 and pinion 42.

The shaft 68 carries above gear 67 the drive gears of the pointer drive arrangement and is rotatably mounted with one end in axial alignment with shaft 43 in the jewel mounting 71, which is seated against the jewel mounting 48 of the pinion shaft 43 and has its other end mounted in a jewel or other suitable bearing 72 seated in a bracket 73 secured to frame 23 below the instrument's dial structure hereinafter to be described. The shaft 68 is spring loaded and to prevent back lash by a hair spring 69 having its inner coil end anchored to the shaft 68 and its outer coil end anchored to a part of bracket 73, and carries a large gear 75 adapted to connect with the fast pointer shaft 76 through a small pinion 77; a relatively smaller but large pinion or gear 78 mounted on or fixed to the shaft 68 above the spring 64 in mesh with a gear 81 fixed to the sleeve shaft 82 of a second speed pointer which is mounted concentrically of and turns around shaft 76; and smaller gear 83 in mesh with a larger gear 84 of a third or slow pointer on or fixed to a hollow or sleeve shaft 85 mounted concentrically of and adapted to turn around the shaft 82.

The shafts 76, 82 and 85 are of progressively varied lengths to provide for receiving and mounting their respective pointers 86, 87 and 88 for rotation around a suitably marked fixed dial 89 carried by the frame 16 and having an aperture 90 therein to expose a portion of an under-dial 91. Shaft 76, for example, is mounted in a bracket plate 79 and eccentric bushings 80 and 80a in frame 23 so that the mesh between the teeth of pinion 77 and gear 75 and the other sets or pairs of intermeshing gears of the different pointers as described above, may be adjusted. The gear ratios of the pointer gear connections are such that the instrument may take care of altitudes up to 55,000 feet or 75,000 feet by varying said ratios, especially between the sector gear 41 and pinion 42. For example, gears 77, 81 and 84 each are arranged to directly drive their respective pointers 86, 87 and 88, so that the fast pointer 86 indicates one thousand feet per revolution, the second pointer 87 indicates ten thousand feet per revolution and the third pointer 88 indicates fifty thousand feet for one half of a revolution. By changing the ratio between sector gear 41 and pinion 42 on pinion shaft 43, this altimeter can be made to take care of altitudes up to 75,000 feet.

When aneroid 20 is actuated by change of barometric pressure at different altitudes, the rock shaft 31 is actuated through link 28 to cause movement of gear sector 41, thereby operating pointers 86, 87 and 88 in the proper ratio through their immediate gear connections 75—77, 78—81, and 83—84, driven from the pinion shaft 43 and through the gear sets 56—65 and 66—67 carried by normally fixed gear 51.

*Pointer setting*

As is well known in the art the pointers 86, 87 and 88 will indicate the altitude with respect to standard barometric pressure at sea-level and not the true altitude with respect to the ground; i. e., the pointers would indicate zero only when the instrument is at sea-level under normal conditions. To give true altitude with respect to any ground altitude, novel means are provided for adjusting the pointers to indicate zero when the instrument is on the ground regardless of the altitude of the ground with respect to sea-level. Also, such novel means provides for setting the instrument for one condition of ground altitude with respect to a second condition of altitude at some other point. In the form shown, such novel means for setting the pointers comprises a planetary arrangement, which normally constitutes a part of the pointer gear train, there being no planetary action except when setting the pointers.

This planetary arrangement includes the large carrier gear 51 and the two relatively smaller orbit gears 65 and 66 on the shaft 57 journaled in the brackets 63 and 64 secured to the upper and lower sides of planetary gear 51.

Large planetary gear 51 is rotable manually from knob 92 which is secured to shaft 93 resiliently held down by a spring 106 in an open cavity within a vertical boss or extension 25b outside of casing 25, see Figures 10 and 11. Between bezel cover 18 and the top flange of casing 25 and mounted around the upper end of shaft 93 is the coil thrust spring 106 adapted to seat in socket 107 in the cover 18 and engage at its other end on flange 108 of shaft 93 so as to retain the shaft flange 108 seated against packing 109. An elongated pinion gear 94 is fixed to the shaft 93 and meshes with the upper gear teeth 98 of a double gear 95. The double gear 95 is fixed to a sleeve 95a which is rotatably mounted on an upright shaft 96a. The sleeve 95a and gear 95 are urged upwardly by a coil spring 97 abutting the lower face of the gear 95 and the horizontal inner wall of the boss 25b. A threaded shaft 96 is provided accessible from the front of the instrument (Fig. 1) which abuts the upper face of the gear 95 and maintains the teeth 98 and 104 of said gear in mesh with the gears 101 and 100 respectively, against the bias of the spring 97.

The gear 100 is rotatably mounted on staff 103 journalled through the frame 23, while the gear 101 is fixed to the staff 103 and rotates with a gear 102 also fixed on the staff 103. The gear 102 meshes with a ring gear 99 integral with the under dial 91, while the gear 100 meshes with the large carrier gear 51 of the planetary gear train. Rotation of the knob 92 will thus be transmitted by pinion 94 to the double gear 95 and then to the gear 99 of the under dial and gear 51 of the planetary gear train. By turning the threaded staff 96, the pressure thereof will be released from gear 95 to permit the spring 96 to shift the double gear 95 so that the gear teeth 98 will unmesh from teeth 101. The rotation of the knob 92 will now be transmitted only to the planetary gear train permitting the indicator hands to be set without disturbing the setting of the under dial 91.

The gear 51 rotates in the lower frame 23 against the resistance or friction of the spring clutch plate 52 according to the turning of knob 92; and staff 57 mounted in brackets 63 and 64 carried by the large planetary gear rotates with it to thereby provide orbital movement of gears 65 and 66 with respect to gears 56 and 67.

As staff 57 rotates, differential orbit gears 65 and 66 move around gear 56 on pinion shaft 43 and gear 67 on shaft 68; and as pinion shaft 43 is held fixed due to gear sector 41 being in mesh with pinion gear 42 fixed thereto, only shaft 68 and gears 66 and 67 are moved. Obviously, movement of shaft 68 will adjust the pointers 86, 87 and 88 proportionally through their respective gears 75—77; 78—81; 83—84, and as pinion shaft 43 does not rotate there is no interference with the actuation of aneroid 20.

With the foregoing arrangement, it is apparent that the pressure responsive element 20, while and during the time that a setting is being made by rotating carrier gear 51 and differential orbit gears 65 and 66 to angularly set the pointers, is constantly responsive to barometric pressure for varying altitudes, as it is undisturbed by movement of the planetary gear train.

The cover 18 previously referred to has a pair of adjacent apertures in one corner as shown in Figure 1, each of said apertures being in alignment with drilled openings in the corner of casing 25 through which extend the knob shaft 93 and the slotted end of an adjustable shaft 96 the exposed upper end of which is slotted for taking a key or screw driver for adjustment; as shown in Figures 10 and 11, whereby gears 98 and 104 may be adjusted with respect to the intermediate gear 101 for the under-dial adjustment and the intermediate gear 100 for providing rotation to large planetary gear 51.

Operation

The dial 89 of the altimeter is graduated in feet and with the aid of pointers will measure up to 55,000 feet or 75,000 feet where the ratio of sector gear 41 and pinion 42 is so arranged. As previously stated, dial 89 is apertured at 90 to expose the under-dial 91, on which is marked the standard barometric pressure scale 106. By changing the reading of this device by the setting means as described to accord with the atmospheric pressure reported at the ground for any point over which, or toward which the airplane is flying, indications of altitude may be corrected while the craft is in flight.

For example, suppose an airplane takes off from an airport, the elevation of which is precise sea-level. Barometric pressure is exact standard, so the pilot sets the barometric scale 106 on the under-dial to read 29.92 at aperture 90. The airport at which the plane plans to land is about 500 miles distant and is also at sea-level elevation.

During flight between the original airport to the distant airport the aneroid 20 will expand upon leaving the earth's surface and through link 28 motion is transmitted to rock shaft 31. Gear sector 41 fastened to the rock shaft 31, transmits motion through pinion 42 to pinion shaft 43 which, in turn, transmits motion to shaft 57. Shaft 57, in turn, transmits motion to shaft 68 through differential gear sets 56—65, 66—67, and large gear 75 then transmits motion to pinion shaft 76 through pinion 77 to drive the fast pointer 86. Also, pointers 87 and 88 are likewise driven directly by their respective gearing at relatively slower predetermined speed ratios around the dial 89 to indicate relatively higher altitudes in feet for the original barometric pressure at the starting airport.

However, the objective airport, 500 miles away, has a barometric pressure reading of 29.38 inches of mercury instead of 29.92 inches of mercury and the pilot may be so informed by radio as he prepares for landing. This lower than standard pressure causes the altimeter to give an altitude indication of 500 feet more than the true altitude, and if the airplane were to land with the barometric scale unchanged, the altimeter would indicate an altitude of 500 feet at the moment the wheels of the craft touched the ground. Under conditions of poor visibility, this could very probably result in a crash landing. However, the pilot upon being duly notified of such prevailing barometric pressure at the ground level of this airport, resets his barometric scale by turning the under-dial 91 to read 29.38, which simultaneously and proportionally turns the interconnected carrier gear 51 of the planetary gear train, so as to set the pointers to indicate altitude based from zero for a barometric reading of 29.38. Consequently, when the wheels of the aircraft touch the ground, the altimeter reads zero.

The actual chain of operation, which causes resetting of the pointers begins with turning knob 92 to simultaneously impart a turn to ring gear 99 of the under-dial 91 and the normally fixed large carrier gear 51 against the frictional resistance of spring clutch plate 52 through double gear 95 and intermediate gears 100 and 102, until a barometric scale reading of 29.38 appears through aperture 90 in dial 89. During this period of setting orbital movement is imparted to gears 65 and 66, which are in mesh with gears 56 and 67. Pinion shaft 43 is held against rotation by gear sector 41 actuated only by the aneroid 20 and therefore, gear 56 does not rotate in response to planetation of orbit gear 65, however, shaft 68 is not held against rotation, as it is separately journaled from any driving connection with gear sector 41 and therefore, planetation of orbit gear 66 which has for example, sixty-three teeth to sixty-five for gear 67 causes rotation of shaft 68. Consequently, such rotation of shaft 68 also turns gears 75, 78 and 83 mounted thereon and drives gears 77, 81 and 84 mounted on shafts 76, 82 and 85, respectively, which gears respectively mesh with each of said gears on shaft 68, to thereby set the respectively associated pointers at proportional speeds to provide indications of true altitudes in feet for the barometric ground pressure of 29.38.

Thus there are provided novel improvements in sensitive altimeters, whereby increased ranges of aneroid deflection are obtained by a novel gear train arranged to drive each pointer direct to thereby eliminate drag on the fast pointer shaft and give more sensitivity, and whereby a portion of the novel gear train is convertible to a novel planetary action for setting the indicating pointers to correct for changes in barometric pressures from one condition for another.

Also, such novel planetary arrangement is so designed that no interference is had with the aneroid's position and the instrument will continue to give indications of altitude during settings to obtain true altitude readings.

While only one embodiment of the invention has been illustrated and described, other changes and modifications which will now appear to those skilled in the art, may be made without departing from the scope of the present invention. Reference is, therefore, to be had to the appended claims for a definition of the limits of the present invention.

We claim:

1. In an altimeter, means for driving a plurality of indicator hands at different relative speeds comprising an aneroid actuated sector gear, a differential gear train adapted to be driven by said sector gear, a shaft driven by said differential gear train, a plurality of gears of relatively different sizes mounted on said shaft, a first hand shaft, a gear on said first hand shaft in mesh with one of said plurality of gears, a second slower hand shaft around said first hand shaft, a gear on said second slower shaft in mesh with another of said plurality of gears, a third still slower hand shaft mounted around said second hand shaft, a gear on said last-named hand shaft in mesh with another of said plurality of gears, a hand mounted on each hand shaft, each of said respective shafts being mounted so as to rotate individually when their respective intermeshing gears are moved, and means rotatable about the axis of the shaft driven by said differential gear train to provide planetary movement of said differential gear train, so as to set each of said hands during said planetary movement with respect to a desired condition, by thus rotating said differentially driven shaft to a relatively different predetermined angular position representative of said desired condition to be attained.

2. A sensitive altimeter including a casing, a frame in said casing, a plurality of pointer shafts journaled for rotation in said frame including a fast pointer shaft, a gear shaft adapted to carry separate gear means for directly driving each of said pointer shafts also journaled for rotation in said frame, intermeshing gear means carried by each of said pointer shafts and said gear shaft, a sector gear, an altitude sensitive means connected to said sector gear adapted to drive the same, a differential gear train in mesh with said gear shaft and adapted to be actuated by said sector gear, and a carrier gear rotatably mounted on said frame to pivot about the axis of rotation of said gear shaft and carrying said differential gear train, means geared to said carrier gear to actuate the same to rotate said differential gear train around the axis of rotation of said gear shaft to thereby provide driving torque to said pointer driving gear shaft and thereby set each of said pointers to function from zero according to any predetermined barometric pressure.

3. In an altimeter, an indicator pointer, means for setting the indicator pointer for predetermined barometric pressures prevailing at different locations comprising a rotatable resetting shaft, a double gear rotatable therewith, gear means in mesh with one of said double gears, differential gear means including a friction held gear and a double differential gear rotatably carried thereby arranged for planetary movement around the axis of said carrying gear, said differential gear adapted to normally drive the indicator pointer, a barometric pressure element for rotating said differential gear; the starting cycle of said pointer being adjusted according to a barometric pressure prevailing at another location by the rotation of said carrying gear by the rotation of said resetting shaft providing planetary movement to said differential gear means without changing the datum of the barometric pressure element, gear means in mesh with the second of said double gears, and means carried by said last gear means and adapted to register with an index for indicating the barometric pressure set into said instrument upon rotation of said resetting shaft.

4. In an altimeter, an indicator pointer, means for setting the indicator pointer for predetermined barometric pressures prevailing at different locations comprising a rotatable resetting shaft, a double gear rotatable therewith and shiftable along its pivotal axis, a spring biasing said double gear in one direction along its pivotal axis, an adjustable abutment in opposed relation to said spring for said double gear, gear means in mesh with one of said double gears, differential gear means including a friction held gear and a double differential gear rotatably carried thereby arranged for planetary movement around the axis of said carrying gear, said differential gear adapted to normally drive the indicator pointer, a barometric pressure element for rotating said differential gear; the starting cycle of said pointer being adjusted according to a barometric pressure prevailing at another location by the rotation of said carrying gear by the rotation of said resetting shaft providing planetary movement to said differential gear means without changing the datum of the barometric pressure element, gear means in mesh with the second of said double gears, and means carried by last said gear means and adapted to register with an index for indicating the barometric pressure set into said instrument upon rotation of said resetting shaft, last said gear means being disengageable from said second of said double gears by movement of said adjustable abutment whereby said differential gear means may be adjusted independently of the last said barometric pressure indicating means.

ANTON MENZER.
WILLIAM E. NAYLOR.

REFERENCES CITED

The following references are of record in the file of this patent:

UNITED STATES PATENTS

| Number | Name | Date |
| --- | --- | --- |
| 2,099,467 | Carbonara | Nov. 16, 1937 |
| 2,260,541 | Schwenn | Oct. 28, 1941 |
| 2,325,282 | Schwenn | July 27, 1943 |
| 2,435,289 | Raney | Feb. 3, 1948 |